United States Patent
Jeon et al.

(10) Patent No.: US 8,243,624 B2
(45) Date of Patent: Aug. 14, 2012

(54) ROUTING TABLE GENERATION, DATA TRANSMISSION AND ROUTING ROUTE FORMATION METHOD FOR MULTI-HOP SERVICES IN HIGH RATE WIRELESS PERSONAL NETWORKS

(75) Inventors: Young Ae Jeon, Daejeon (KR); Seong-hee Lee, Daejeon (KR); Sangsung Choi, Daejeon (KR); Kwang Roh Park, Daejeon (KR); Sung-Woo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 350 days.

(21) Appl. No.: 12/542,101

(22) Filed: Aug. 17, 2009

(65) Prior Publication Data

US 2010/0046435 A1 Feb. 25, 2010

(30) Foreign Application Priority Data

Aug. 19, 2008 (KR) .................. 10-2008-0080949
Aug. 10, 2009 (KR) .................. 10-2009-0073469

(51) Int. Cl.
*H04W 24/00* (2009.01)
*H04W 40/02* (2009.01)
*H04W 40/12* (2009.01)
*H04W 40/38* (2009.01)

(52) U.S. Cl. ........ 370/254; 370/238; 370/328; 370/338; 455/452.2; 455/453; 709/241; 709/242

(58) Field of Classification Search .................. 370/238, 370/254, 255, 328, 329, 338, 389, 390; 455/422.1, 455/450, 452.1, 452.2, 453; 709/241, 242

See application file for complete search history.

(56) References Cited

U.S. PATENT DOCUMENTS

| | | | | |
|---|---|---|---|---|
| 7,002,938 B2 * | 2/2006 | Hester et al. | ................... | 370/330 |
| 7,406,054 B2 | 7/2008 | Seo et al. | | |
| 7,450,517 B2 * | 11/2008 | Cho | ............................ | 370/238 |
| 7,515,571 B2 * | 4/2009 | Kwon et al. | ................... | 370/338 |
| 7,706,282 B2 * | 4/2010 | Huang | ........................... | 370/238 |
| 7,937,088 B2 * | 5/2011 | Nanda | ........................... | 455/445 |
| 8,036,207 B2 * | 10/2011 | Sivakumar et al. | ........... | 370/351 |
| 2002/0044549 A1 * | 4/2002 | Johansson et al. | ............ | 370/386 |
| 2003/0224787 A1 * | 12/2003 | Gandolfo | ....................... | 455/434 |

(Continued)

FOREIGN PATENT DOCUMENTS

KR 10-2005-0106815 A 11/2005

(Continued)

*Primary Examiner* — Chi Pham
*Assistant Examiner* — Ahmed Elallam
(74) *Attorney, Agent, or Firm* — Kile Park Goekjian Reed & McManus PLLC

(57) ABSTRACT

Provided are a routing table generating method, a data transmission method, and a routing route formation method for multi-hop communication in high rate wireless personal networks. In a high rate WPAN environment including a plurality of piconets, a piconet controller (PNC), which performs a topology server function to provide the optimal route, collects link state information from the PNCs or DEVs (devices) belonging to a sub-tree that serves as a root and applies a minimum cost algorithm based on the collected link state information to calculate the optimal route for all pairs of originations and destinations existing within the sub-tree in consideration of QoS. The optimal route information is transmitted to the origination PNC via the destination PNC/DEV. During performing this, the optimal route between the pairs of originations and destinations is set.

20 Claims, 11 Drawing Sheets

U.S. PATENT DOCUMENTS

| | | | |
|---|---|---|---|
| 2004/0090943 A1* | 5/2004 | da Costa et al. | 370/338 |
| 2004/0233847 A1 | 11/2004 | Park et al. | |
| 2005/0122944 A1* | 6/2005 | Kwon et al. | 370/338 |
| 2005/0152381 A1* | 7/2005 | Kim | 370/401 |
| 2005/0169292 A1* | 8/2005 | Young | 370/432 |
| 2005/0237993 A1* | 10/2005 | Hong et al. | 370/349 |
| 2008/0101244 A1* | 5/2008 | Liu et al. | 370/238 |

FOREIGN PATENT DOCUMENTS

| | | |
|---|---|---|
| KR | 10-0577352 | 4/2006 |
| KR | 10-0645428 | 11/2006 |
| KR | 10-0650114 | 11/2006 |

* cited by examiner

ROUTING TABLE GENERATION, DATA TRANSMISSION AND ROUTING ROUTE FORMATION METHOD FOR MULTI-HOP SERVICES IN HIGH RATE WIRELESS PERSONAL NETWORKS

CROSS-REFERENCE TO RELATED APPLICATION

This application claims priority to and the benefit of Korean Patent Application No. 10-2008-0080949 and 10-2009-0073469 filed in the Korean Intellectual Property Office on Aug. 19, 2008 and Aug. 10, 2009, the entire contents of which are incorporated herein by reference.

BACKGROUND OF THE INVENTION (a) Field of the Invention

The present invention relates to a routing table generating method, a data transmission method, and a routing route formation method for multi-hop communication in high rate wireless personal networks.

(b) Description of the Related Art

A High Rate Wireless Personal Area Network (hereinafter, referred to as 'High Rate WPAN') is a low power, low cost wireless networking technology for multimedia data transmission at a short distance within 10 m.

The high rate WPAN is formed through a piconet, which includes at least two devices (hereinafter, referred to as "DEV") and any one of a plurality of devices serves as a piconet controller (hereinafter, referred to as 'PNC') that manages the piconet.

At this time, since the devices configuring the piconet that forms the high rate WPAN can perform communication only by a single hop manner, when the high rate WPAN is formed though the plurality of piconets, there is a problem in that the communication cannot be performed even when a physical link exists between the devices included in different piconets.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in effort to provide multi-hop services in a high rate WPAN.

An exemplary embodiment of the present invention provides a routing table generating method in a wireless personal network including a plurality of devices, wherein the wireless personal network includes a plurality of piconets, and the plurality of piconets including a parent piconet and a plurality of child piconets, the routing table generating method including: transmitting, by a controller of the parent piconet, a link state request message to each controller of the plurality of child piconets; receiving, by the controller of the parent piconet, a plurality of link state registration messages from each controller of the plurality of child piconets; generating, by the controller of the parent piconet, a link cost table including the link state information between each controller of the plurality of child piconets and the controller of the parent piconet based on the plurality of link state registration message; and generating, by the controller of the parent piconet, the routing table including the optimal route information between a first device and a second device among the plurality of devices by applying a minimum cost algorithm to the link cost table.

At this time, a link state registration messages includes the link state information of corresponding child piconet.

Further, the child piconet may include a part of the plurality of devices and the link state registration message may include the link state information for the devices included in the piconet.

At this time, the optimal route information may include addresses of devices existing on the optimal route between the first device and the second device.

In addition, the device existing on the optimal route may include the controller of the piconet including the first device of the plurality of piconets and the controller of the piconet including the second device of the plurality of piconets.

Moreover, the device existing on the optimal route may include the controller of any one of some piconets other than the piconet including the first device and the piconet including the second device in the plurality of piconets.

At this time, the routing table generating method may further include receiving a route discovery message for discovering a route between the first device and the second device from the controller of the piconet including the first device by the controller of the parent piconet; and transmitting a route notification message including the optimal route information to the controller of the piconet including the second device according to the route discovery message by the controller of the parent piconet.

Herein, the routing table generating method may further include receiving a route error message notifying that a wireless link drops between the controller of the second piconet and the controller of the first piconet of the plurality of piconets from the controller of the first piconet including the first device of the plurality of piconets by the controller of the parent piconet; and updating the routing table based on the route error message by the controller of the parent piconet.

Also, the updating the routing table may update the optimal route information to bypass route information between the first device and the second device by the controller of the parent piconet.

Yet exemplary embodiment of the present invention provides a data transmission method in a wireless personal network including a plurality of devices, wherein the wireless personal network includes a plurality of piconets and a topology server, the topology server including routing route information between the plurality of devices, the data transmission method including: receiving, by a first controller of a first piconet among the plurality of piconets, a data frame to be transmitted from a first device included in the first piconet to a second device included in a second piconet among the plurality of piconets; receiving a route formation message including route information between the first device and the second device from a second controller included in the second piconet by the first controller; and transmitting, by the first controller, the data frame to the second device via the second controller according to the route information.

In addition, the method further includes transmitting, by the first controller, a route discovery message for discovering a route between the first device and the second device to the topology server when there is no route information between the first device and the second device in the first controller, wherein the route formation message from the second controller is generated based on information from the topology server according to the route discovery message.

At this time, the route information may include addresses of devices existing on the optimal route between the first device and the second device.

Further, the route information may include an address of the first controller and an address of the second controller.

In addition, the route information may further include an address of a third controller included in a third piconet of the plurality of piconets.

Herein, the data transmission method may further include transmitting the data frame to the second device according to the route information when the first controller stores the route information.

Another exemplary embodiment of the present invention provides a routing route formation method in a wireless personal network, wherein the wireless personal network includes a plurality of piconets and a topology server, the topology server including routing route information between the plurality of devices, the routing route formation method including: receiving, a first controller included in a first piconet of the plurality of piconets, a route notification message including route information between a first device included in the first piconet and a second device included in a second piconet among the plurality of piconets from the topology server; updating, by the first controller, an optimal path between the first device and the second device stored in the first controller according to the path information; generating, by the first controller, a route formation message including the route information to form the route between the first device and the second device; and transmitting, by the first controller, the route formation message to the second controller included in the second piconet so that the second controller updates the optimal route between the first device and the second device according to the route information.

At this time, the route information may include addresses of devices existing on the optimal route between the first device and the second device.

Further, the route information may include an address of the first controller and an address of the second controller.

Also, the route information may further include an address of a third controller included in a third piconet of the plurality of piconets.

DETAILED DESCRIPTION OF THE EMBODIMENTS

Figure 1:
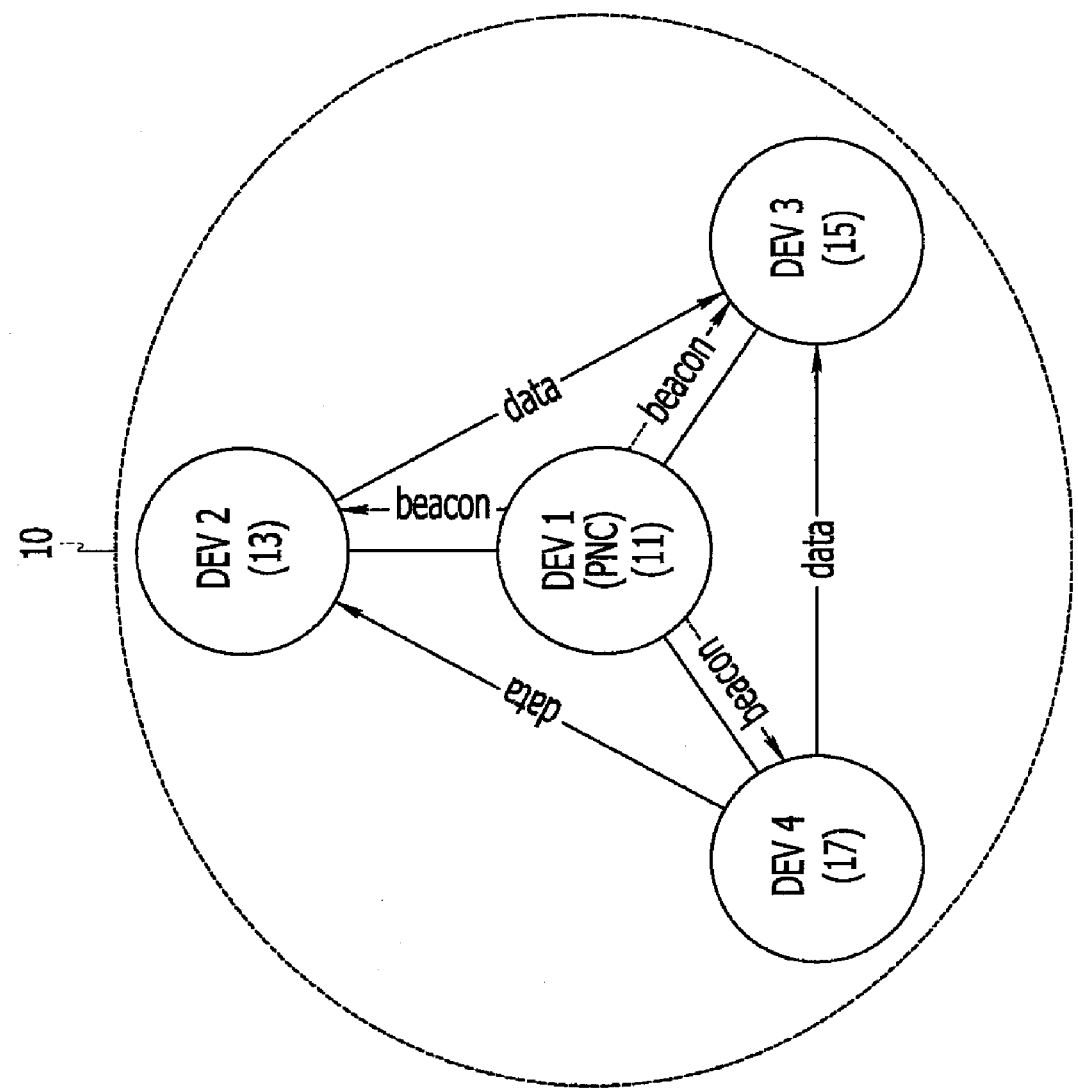
FIG. 1 is a diagram showing a configuration of a first high rate WPAN including a single piconet.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

Hereinafter, a routing table generating method, a data transmission method, and a routing route formation method for multi-hop services in high rate wireless personal networks will be described with reference to the accompanying drawings.

First, a high rate wireless personal area network (hereinafter, referred to as 'WPAN') according to the related art will be described with reference to FIGS. 1 and 2.

FIG. 1 is a diagram showing a configuration of a first high rate WPAN including a single piconet.

As shown in FIG. 1, a first piconet 10 configuring a first high rate WPAN includes a plurality of devices (hereinafter, referred to as 'DEV'), that is, a first device DEV 1, 11, a second device DEV 2, 13, a third device DEV 3, 15, and a fourth device DEV 4, 17.

At this time, any devices of a plurality of devices included in the first piconet 10 may be selected as a piconet controller (hereinafter, referred to as 'PNC') of the first piconet 10 and in FIG. 1, a case where the first device 11 is selected as the piconet controller of the first piconet 10 will be described as an example.

The first device 11 corresponding to the piconet controller of the first piconet 10 manages a basic timing of the first piconet 10 using a beacon frame. Each of the second device 13, the third device 15, and the fourth device 17 synchronizes with the beacon frame transmitted from the first device 11 and communicates with other devices included in the first piconet 10 in a single-hop manner using the beacon information of the received beacon frame.

For example, the second device 13 communicates with the third device 15 in the single-hop manner through the wireless link between the second device 13 and the third device 15 to transmit data to the third device 15. However, the second device 13 cannot communicate with the third device 15 in a multi-hop manner passing through the first device 11.

Figure 2:
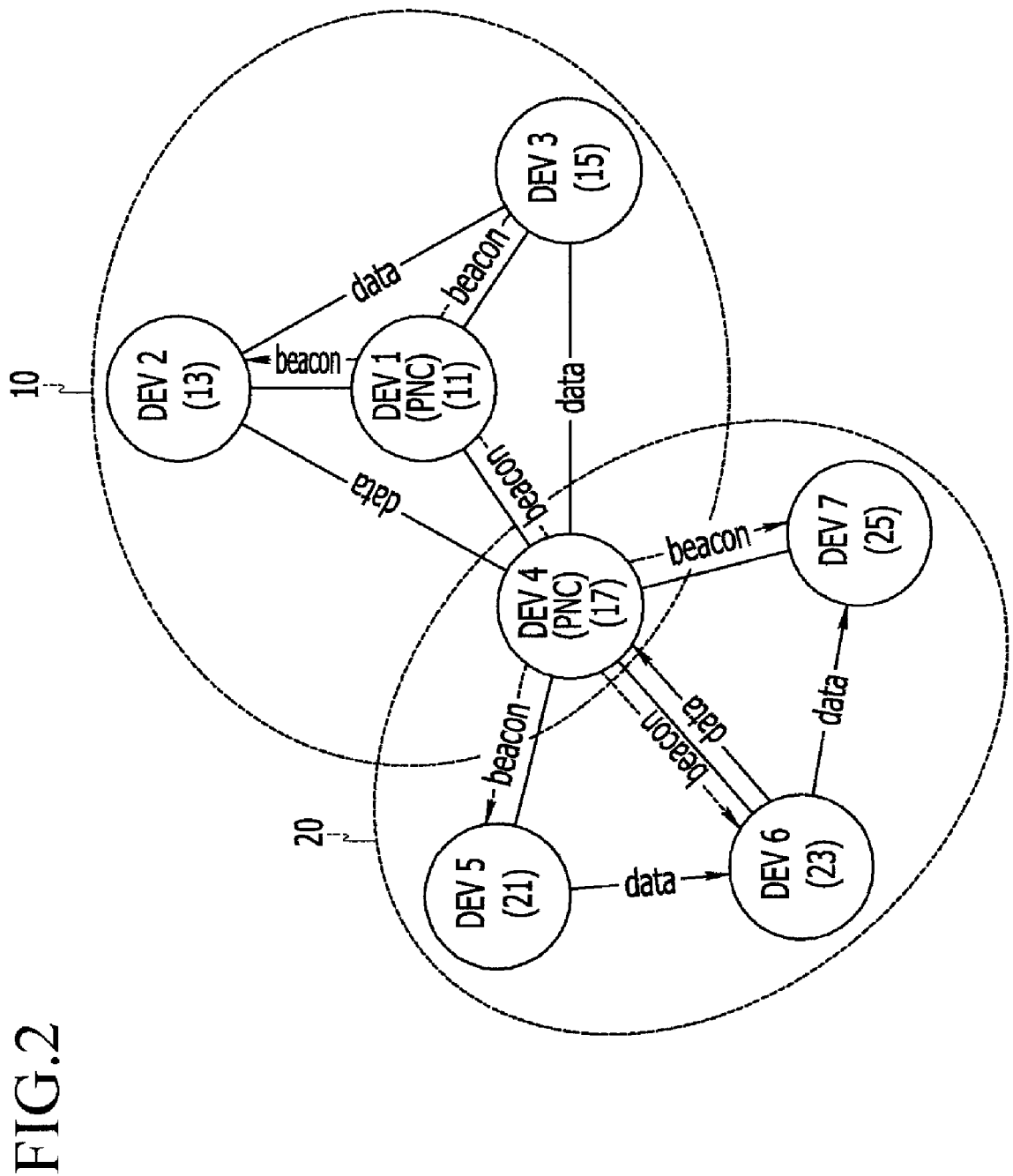
FIG. 2 is a diagram showing a configuration of a second high rate WPAN including a parent piconet and child piconets.

FIG. 2 is a diagram showing a configuration of a second high rate WPAN including a parent piconet and child piconets.

At this time, the second high-rate WPAN has a form that one parent piconet and one child piconet coexists in the same channel.

As shown in FIG. 2, the second high rate WPAN includes the first piconet 10 corresponding to the parent piconet and the second piconet 20 corresponding to the child piconet of the first piconet 10.

The first piconet 10 includes the first device DEV 1, 11, the second device DEV 2, 13, the third device DEV 3, 15, and the fourth device DEV 4, 17 and the second piconet 20 includes the fourth device DEV 4, 17, a fifth device DEV 5, 21, a sixth device DEV 6, 23, and a seventh device DEV 7, 25.

At this time, in FIG. 2, a case where the first device 11 is selected the piconet controller (PNC) of the first picone 10 and the fourth device 17 included in the first piconet 10 is selected as the piconet controller (PNC) of the second piconet 20 will be described as an example.

Each of the first device 11, the second device 13, the third device 15, and the fourth device 17 included in the first piconet 10 communicates with devices included in the first piconet 10 in the single-hop manner.

Each of the fourth device 17, the fifth device 21, the sixth device 23, and the seventh device 25 included in the second piconet 20 communicates with devices included in the second piconet 20.

However, except for the fourth device 17 that is a piconet controller of the second piconet 20, the fifth device 21, the sixth device 23, and the seventh device 25 included in the second piconet 20 cannot communicate with other devices of the first piconet 10 in the single-hop manner and cannot communicate with other devices of the first piconet in the multi-hop manner passing through the fourth device 17.

For example, even when there is a physical link between the third device 15 and the seventh device 25, the third device 15 and the seventh device 25 cannot communicate with each other in the single-hop manner or the multi-hop manner.

As such, in the high rate WPAN according to the related art, since only the devices in the piconet can communicate with each other in the single-hop manner, there is a problem in that they cannot communicate with devices in another piconet.

Next, the high rate WPAN according to an exemplary embodiment of the present invention will be described with reference to FIG. 3.

Figure 3:
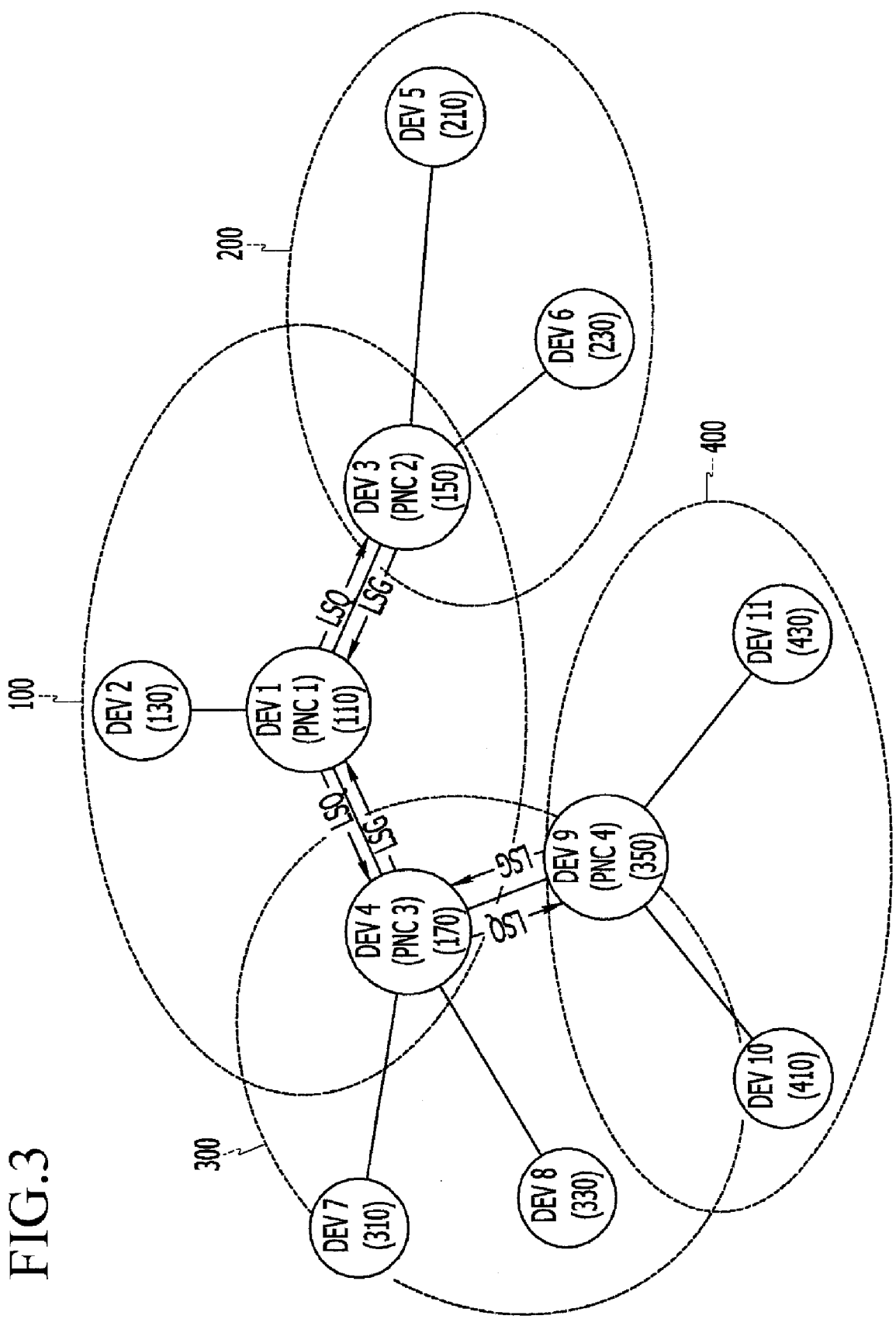
FIG. 3 is a diagram showing a configuration of a high rate WPAN according to an exemplary embodiment of the present invention.

FIG. 3 is a diagram showing a configuration of a high rate WPAN according to an exemplary embodiment of the present invention.

At this time, the high rate WPAN according to an exemplary embodiment of the present invention can form a tree structure by repetitively building the parent-child piconet.

As shown in FIG. 3, the high rate WPAN according to an exemplary embodiment of the present invention includes a plurality of piconets, that is, a first piconet 100, a second piconet 200, a third piconet 300, and a fourth piconet 400. At this time, the first piconet 100 corresponds to the parent piconet of the second piconet 200 and the third piconet 300 and the second piconet 200 and the third piconet 300 correspond to the child piconet of the first piconet 100. Further, the third piconet 300 corresponds to the parent piconet of the fourth piconet 400 and the fourth piconet 400 corresponds to the child piconet of the third piconet 300.

The first piconet 100 includes a plurality of devices, that is, a first device(DEV 1, 110), a second device(DEV 2, 130), a third device(DEV 3, 150), and a fourth device(DEV 4, 170). At this time, the first device 110 serves as a piconet controller (PNC 1) in the first piconet 100. Further, the first device 110 can serve as a topology server of the high rate WPAN.

The second piconet 200 includes a plurality of devices, that is, a third device 150, a fifth device(DEV 5, 210), and a sixth device(DEV 6, 230). At this time, the third device 150 serves as the piconet controller (PNC 2) in the second piconet 200.

The third piconet 300 includes a plurality of devices, that is, a fourth device 170, a seventh device(DEV 7, 310), an eighth device(DEV 8, 330), and a ninth device(DEV 9, 350). At this time, the fourth device 170 serves as a piconet controller (PNC 3) in the third piconet 300.

The fourth piconet 400 includes a plurality of devices, that is, a ninth device 350, a tenth device(DEV 10, 410), and an eleventh device(DEV 11, 430). At this time, the ninth device 350 serves as a piconet controller (PNC 4) in the fourth piconet 400.

A process that link state information is registered in the topology server corresponding to a route of a sub-tree to which the piconet controllers of each piconet in the high rate WPAN of the tree structure belongs will be described below.

The first device (PNC 1, 110), which serves as the topology server in the high rate WPAN, generates a link state request (hereinafter, referred to as 'LSQ') message to transmit it to the piconet controllers of all the child piconets on the tree structure, that is, the third device(PNC 2, 150), the fourth device(PNC 3, 170), and the ninth device(PNC 4, 350), thereby starting the link state registration process.

The piconet controller of the child piconet receiving the LSQ message generates the link state registration (hereinafter, referred to as 'LSG') message as a response thereto and transmits it to the piconet controller of the parent piconet. At this time, the piconet controller of the child piconet receiving the LSQ message can transmit the received LSQ message to the piconet controller of its own child piconet.

By repeating the above process, the topology server can back collect the link state information from the piconet controllers of all the piconets belonging to its own sub-tree.

The topology server starting the link state registration process limits the number of hops transmitted by the LSQ message, thereby making it possible to control the amount of link state information that is managed by the topology server. At this time, the topology server can use a manner such as time-to-line (hereinafter, referred to as 'TTL'), etc.

The LSG message should include the link state information between the piconet controller generating the corresponding message and the adjacent piconet controller. At this time, the topology server can designate a sort of quality of service (hereinafter, referred to as 'QoS') to be included in the link state information as needed when requesting the link state information. Further, the sort of QoS designated by the topology server may correspond to a link characteristic indicator (hereinafter, referred to as 'LQI'), remaining channel time allocation (hereinafter, referred to as 'CTA'), or delay time.

When the change in the link state recognized by the piconet controllers periodically or considerably occurs without the request of the topology server, the piconet controllers registering the link state information in the topology server transmit a new LSG message reflecting the change to the topology server, thereby making it possible to update the link state information of the piconet controllers.

Next, a routing table generating method by the topology server of the high rate WPAN according to an exemplary embodiment of the present invention will be described with reference to FIG. 4. At this time, in FIG. 4, a routing table generating method by the first device 110 that serves as the topology server in the high rate WPAN shown in FIG. 3 will be described.

Figure 4:
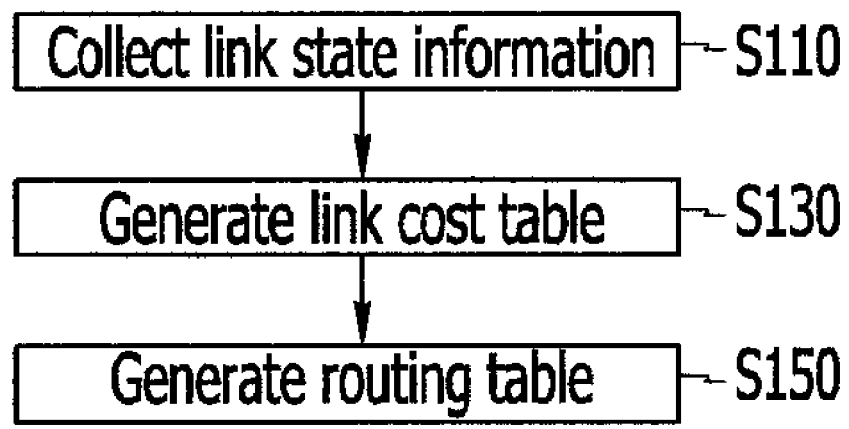
FIG. 4 is a diagram showing a routing table generating method according to an exemplary embodiment of the present invention.

FIG. 4 is a diagram showing a routing table generating method according to an exemplary embodiment of the present invention.

As shown in FIG. 4, the first device 110 that is the piconet controller (PNC 1) in the first piconet 100 collects the link state information on each piconet controller of the plurality of child piconets included in the high rate WPAN (S110). At this time, each piconet controller of the plurality of child piconets included in the high rate WPAN can register the link state information in the first device 110.

Next, the first device 110 generates a link cost table based on the collected link state information on each of the plurality of piconet controllers (S130). At this time, the generated link cost table can follow Table 1.

TABLE 1

|  | PNC 1 | PNC 2 | PNC 3 | ... | PNC N |
|---|---|---|---|---|---|
| PNC 1 | — |  |  | ... |  |
| PNC 2 |  | — |  | ... |  |
| PNC 3 |  |  | — | ... |  |
| ... |  |  |  | ... |  |
| PNC N |  |  |  | ... | — |

As shown in Table 1, the first device 110 stores the link state information between all the piconet controllers included in the high rate WPAN in the link cost table.

Thereafter, the first device 110 generates the routing table based on the generated link cost table (S150). At this time, the first device 110 applies a minimum cost algorithm such as a Bellman-Ford algorithm or a Dijkstra algorithm based on the link cost table, thereby making it possible to generate the routing table. At this time, the generated routing table can follow Table 2.

TABLE 2

| Origination Device | Destination Device | Optimal Route | Sort of QoS | Optimal Route Cost |
|---|---|---|---|---|
| . |  |  |  |  |
| . |  |  |  |  |
| . |  |  |  |  |

As shown in Table 2, the first device 110 stores the results of calculating the optimal routes for each sort of QoS for pairs of all the piconet controllers included in the high rate WPAN in the routing table. At this time, when the sort of QoS is the number of hops or the delay time, the optimal route cost is obtained by summing the link costs of all the links configuring the route. In addition, when the sort of QoS is the LQI or the remaining CTA, the optimal route cost corresponds to the link cost of the link providing the minimum value among the links configuring the route.

Next, a method of registering the link state information in the first device 100 by the piconet controller included in the high rate WPAN according to an exemplary embodiment of the present invention will be described with reference to FIG. 5.

Figure 5:
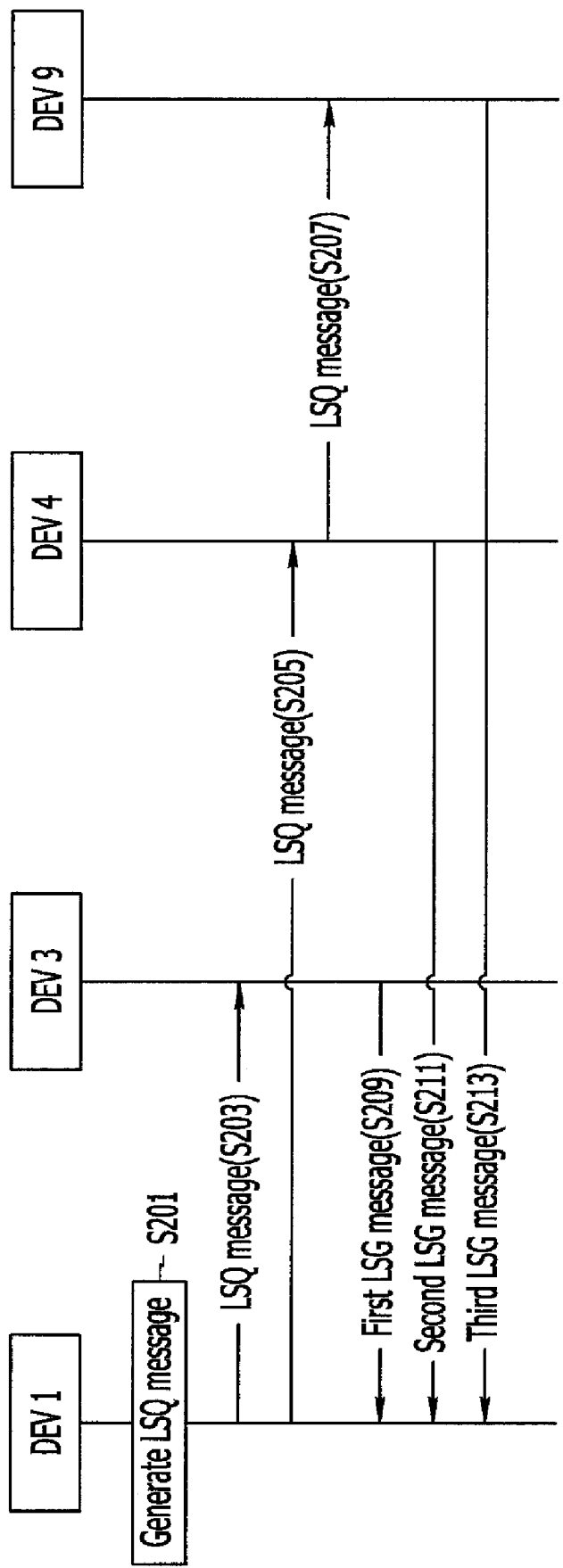
FIG. 5 is a diagram showing a link state information registration method according to an exemplary embodiment of the present invention.

FIG. 5 is a diagram showing a link state information registration method according to an exemplary embodiment of the present invention.

As shown in FIG. 5, the first device 110 first generates the link state request (hereinafter, referred to as 'LSQ') message that requests the registration of the link state information (S201). At this time, the first device 110 can designate the sort of quality of service (hereinafter, referred to as 'QoS') to be included in the link state information through the link state request message. Further, the QoS designated by the first device 110 may correspond to the link characteristic indicator (hereinafter, referred to as 'LQI), the remaining channel time allocation(hereinafter, referred to as 'CTA') or the delay time.

Next, the first device 110 transmits the link state request message to the third device 150 that is the piconet controller of the child piconet for the first piconet 100 among the devices included in the first piconet 100 (S203) and transmits the link state request message to the fourth device 170 that is the piconet controller of the child piconet for the first piconet 100 among devices included in the first piconet (S205).

Thereafter, the fourth device 170 transmits the link state request message to the ninth device 350 that is the piconet controller of the child piconet for the third piconet 300 among devices included in the third piconet 300 (S207).

Next, the third device 150 transmits the link state registration (hereinafter, referred to as 'LSG') message including the link state information, that is, a first link state registration message to the first device 110 according to the received link state request message (S209).

Thereafter, the fourth device 170 transmits the link state registration message including the link state information, that is, a second link state registration message to the first device 110 according to the received link state request message (S211).

Next, the ninth device 350 transmits the link state registration message including the link state information, that is, a third link state registration message to the first device 110 according to the transmitted link state request message (S213). At this time, the ninth device 350 may transmit the third link state registration message to the fourth device 170 and the fourth device 170 may transmits the third link state registration message received from the ninth device 350 to the first device 110.

Next, a method of transmitting data frame by the device included in the high rate WPAN according to an exemplary embodiment of the present invention will be described with reference to FIG. 6. At this time, a method of transmitting a data frame to the fifth device 210 by the tenth device 410 included in the high rate WPAN shown in FIG. 3 will be described with reference to FIG. 6.

Figure 6:
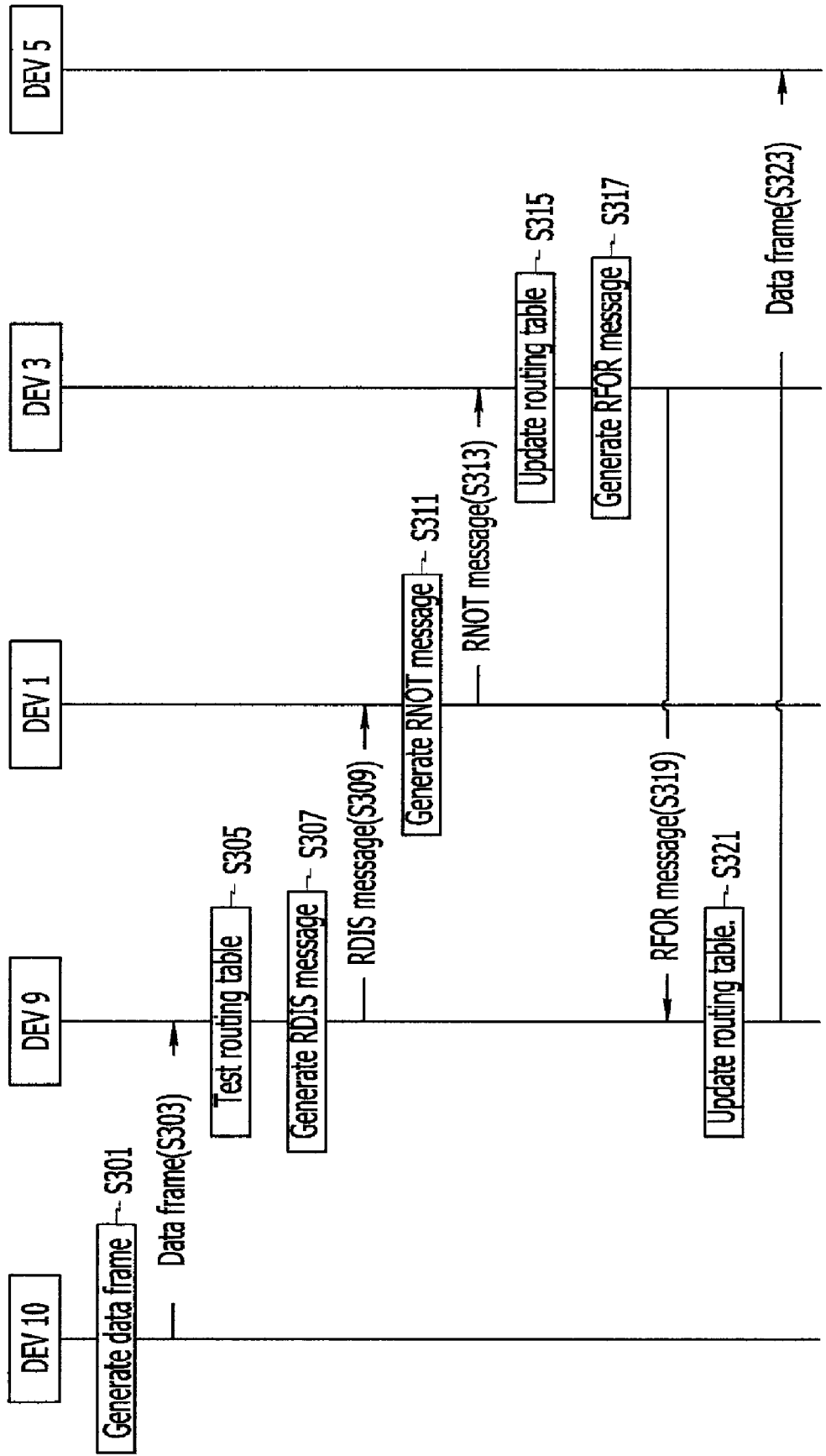
FIG. 6 is a diagram showing a data frame transmission method according to an exemplary embodiment of the present invention.

FIG. 6 is a diagram showing a data frame transmission method according to an exemplary embodiment of the present invention.

As shown in FIG. 6, the tenth device 410 first generates a data frame that includes an address of a destination device, that is, an address of the tenth device 410, and an address of the destination device, that is, an address of the fifth device 210 when data to be transmitted to the fifth device 210 is generated (S301).

Next, the tenth device 410 transmits a data frame to the ninth device 350 that is a piconet controller of the tenth device 410 (S303).

Thereafter, the ninth device 350 tests whether the route information between the ninth device 350 and the third device 150 that is the piconet controller of the fifth device 210 is stored in the routing table stored in the ninth device 350 (S305). At this time, the piconet controller other than the topology server, that is, the first device 110 can store the routing table and the routing table of the piconet controller other than the first device 110 can store the route information using itself as the destination.

Next, the ninth device 350 generates a route discover (hereinafter, referred to as 'RDIS') message for discovering the route between the ninth device 350 and the third device 150 if the route information between the ninth device 350 and the third device 150 is not stored in the routing table of the ninth device 350 (S307). At this time, the route discovery message may include the sort of QoS that will be applied to an address of the piconet controller of the destination device, that is, an address of the ninth device 350, an address of the piconet controller of the destination device, that is, address of the third device 150, and the optimal route.

Thereafter, the ninth device 350 transmits the route discovery message to the first device 110 that serves as the topology server in the high rate WPAN (S309). At this time, since the ninth device 350 cannot communicate with the first device 110 in the single-hop manner, the message can be transmitted to the first device 110 in the multi-hop manner passing through the fourth device 170.

Next, the first device 110 searches the optimal route between the piconet controller of the destination device, that is, the ninth device 350 and the piconet controller of the destination device, that is, the third device 150 in the routing table stored in the first device 110 according to the received route discovery message to generate the route notification (hereinafter, referred to as 'RNOT') message including the optimal route information (S311). At this time, the optimal route between the ninth device 350 and the third device 150 can follow Table 3.

TABLE 3

| Origination Device | Tenth Device |
|---|---|
| First Passage Device | Ninth Device |
| Second Passage Device | Third Device |
| Destination Device | Fifth Device |

When the optimal route follows Table 3, the optimal route information may include the address of the device on the optimal route between the origination device and the destination device, that is, the address of the ninth device 350 and the address of the third device 150 and the optimal route cost on the optimal route between the origination device and the destination device, that is, the optimal route cost between the ninth device 350 and the third device 150.

Hereinafter, the first device 110 transmits the route notification message to the piconet controller of the destination device, that is, the third device 150 (S313).

Next, the third device 150 updates the routing table stored in the third device 150 according to the optimal route information of the received route notification message (S315).

Thereafter, the third device 150 generates the route formation (hereinafter, referred to as 'RFOR') message so that the device on the optimal route corresponding to the optimal route information forms the route between the tenth device 410 and the fifth device 210 (S317). At this time, the piconet controller receiving the route formation message can update the routing table according to the optimal route information included in the route formation message. Further, the route formation message includes the optimal route information between the tenth device 410 and the fifth device 210.

Next, the third device 150 transmits the received route formation message to the ninth device 350 according to reverse order of the optimal route between the tenth device 410 and the fifth device 210 (S319).

Then, the ninth device 350 updates the routing table stored in the ninth device 350 according to the optimal route information of the received route formation message (S321).

Thereafter, the tenth device 410 transmits the data frame received from the tenth device 410 to the fifth device 210 through the optimal route between the tenth device 410 and the fifth device 210 according to the optimal route information of the received route formation message (S323). At this time, the tenth device 410 can transmit the data frame to the fifth device 210 in the multi-hop manner passing through the optimal route between the tenth device 410 and the fifth device 210, that is, the ninth device 350 and the third device 150.

A flow data and messages at the time of transmitting data frame according to an exemplary embodiment of the present invention will be described with reference to FIG. 7. At this time, a flow data and messages according to the data frame transmission method of FIG. 6 will be described in FIG. 7.

Figure 7:
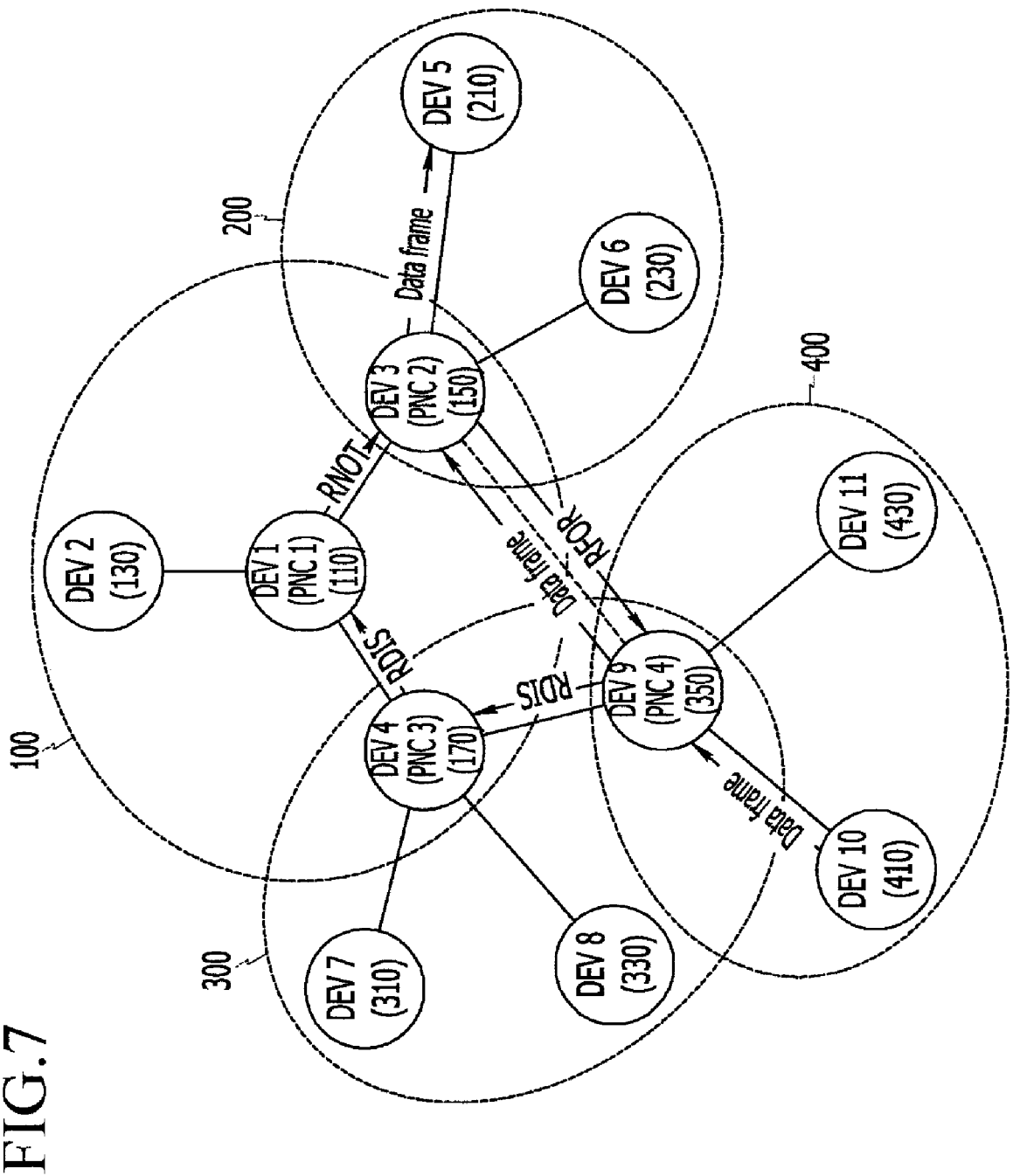
FIG. 7 is a diagram showing a flow of data and messages at the time of transmitting data frame according to an exemplary embodiment of the present invention.

FIG. 7 is a diagram showing a flow data and messages at the time of transmitting data frame according to an exemplary embodiment of the present invention.

As shown in FIG. 7, when the tenth device 410 has the data frame to be transmitted to the fifth device 210, the ninth device 350 that is the piconet controller of the tenth device 410 transmits the RDIS message for discovering the route between the ninth device 350 that is the piconet controller of the tenth device 410 and the third device 150 that is the piconet controller of the fifth device 210 to the fourth device 170 that is the piconet controller of the ninth device 350.

The fourth device 170 transmits the RDIS message received from the ninth device 350 to the first device 110 that is the piconet controller of the fourth device 170.

The first device 110 transmits the RNOT message including the optimal route information between the ninth device 350 and the third device 150 to the third device 150 that is the piconet controller of the destination device according to the RDIS message received from the fourth device 170.

The third device 150 transmits the RFOR message to the ninth device 350 in order to form the optimal route between the ninth device 350 and the third device 150 according to the optimal route information of the RNOT message received from the first device 110.

The ninth device 350 transmits the data frame received from the tenth device 410 in a multi-hop manner passing through the ninth device 350 and the third device 150 to the fifth device 210 according to the received RFOR message.

A method that a topology server of the high rate WPAN according to an exemplary embodiment of the present invention updates the routing table will be described with reference to FIG. 8. At this time, a method that the first device 110 serving as the topology server of the high rate WPAN of FIG. 3 updates the routing table will be described in FIG. 8.

Figure 8:
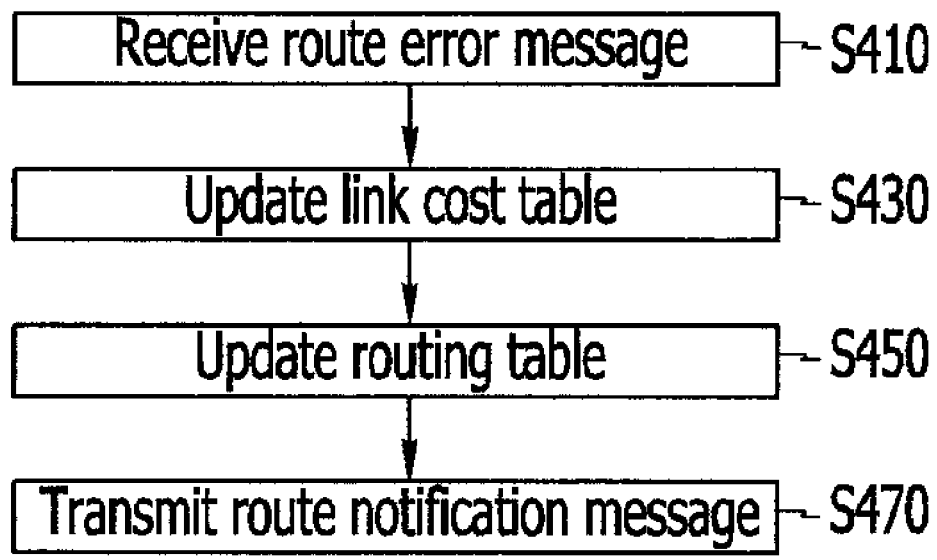
FIG. 8 is a diagram showing a routing table updating method according to an exemplary embodiment of the present invention.

FIG. 8 is a diagram showing a routing table updating method according to an exemplary embodiment of the present invention.

As shown in FIG. 8, the first device 110 first receives a route error (hereinafter, referred to as 'RERR') message transmitted from any one piconet controller of a plurality of piconet controllers included in a high rate WPAN (S410). At this time, when the wireless link drops from an adjacent piconet controller, any one piconet controller of the plurality of piconet controllers included in the high rate WPAN may transmit the route error message including the addresses of the piconet controller recognizing the wireless link drop and the adjacent piconet controller from which the wireless link drops to the first device 110.

Then, the first device 110 updates the link cost table according to the received route error message (S430).

Thereafter, the first device 110 updates the routing table based on the updated link cost table (S450). At this time, the first device 110 may update the routing table by applying minimum cost algorithm based on the updated link cost table.

Then, the first device 110 transmits the route notification message including the bypass route information to a pair of destination piconet controllers whose optimal route is changed into the bypass route based on the updated routing table (S470). At this time, the destination piconet controller that receives the route notification message may transmit the route formation message including the bypass route information to the origination piconet controller according to the bypass route information. Also, the bypass route information may include the address of the piconet controller on the bypass route between the origination piconet controller and the destination piconet controller, and the optimal route cost between the origination piconet controller and the destination piconet controller.

A method that the ninth device 430 of the plurality of piconet controllers included in the high rate WPAN according to an exemplary embodiment of the present invention transmits the route error message to the first device 110 that serves as a topology server of the high rate WPAN will be described with reference to FIG. 9.

Figure 9:
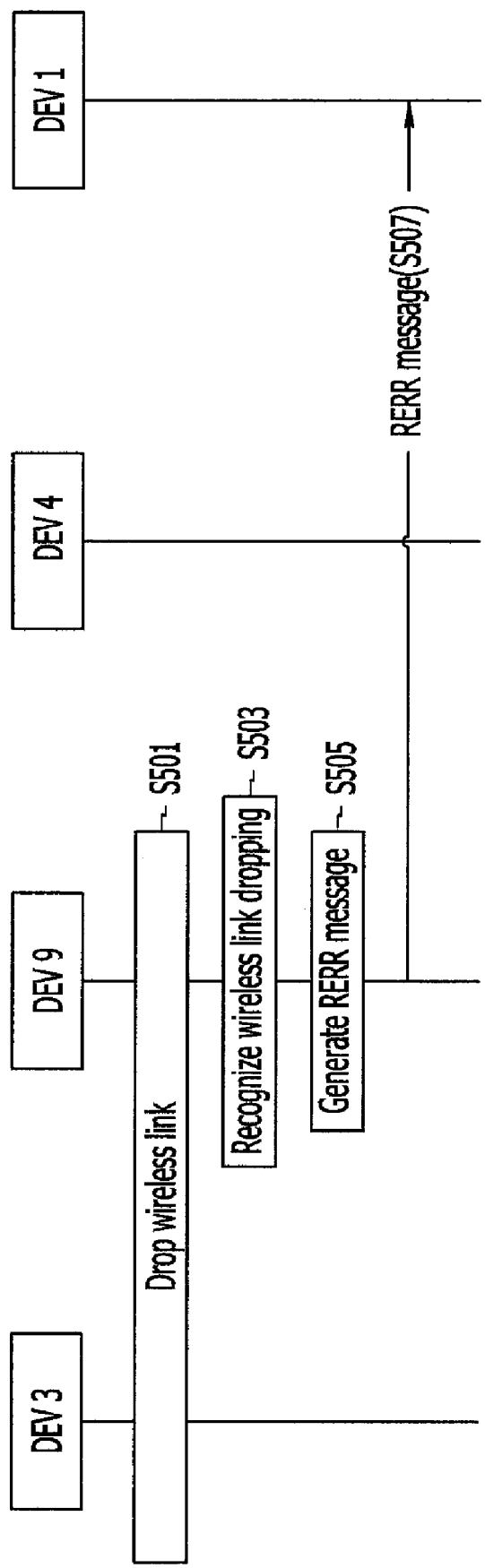
FIG. 9 is a diagram showing a route error message transmission method according to an exemplary embodiment of the present invention.

FIG. 9 is a diagram showing a route error message transmission method according to an exemplary embodiment of the present invention.

As shown in FIG. 9, the wireless link between the ninth device 350 and the third device 150 first drops (S511), and the ninth device 350 may recognize the wireless link drop between the ninth device 350 and the third device 150 (S503).

Then, the ninth device 350 generates the route error message including the address of the piconet controller recognizing the wireless link drop, that is, the address of the ninth device 350, and the address of the piconet controller adjacent to the piconet controller from the wireless link drops, that is, the address of the third device 150 (S505).

Thereafter, the ninth device 350 transmits the route error message to the first device 110 (S507). At this time, since the ninth device 350 cannot communicate with the first device 110 in a single hop manner, it can transmit the message to the first device 110 in a multi-hop manner passing through the fourth device 170 that is the piconet controller of the third piconet 300.

A bypass route setting method between the tenth device 410 and the fifth device 210 according to an exemplary embodiment of the present invention will be described with reference to FIG. 10.

Figure 10:
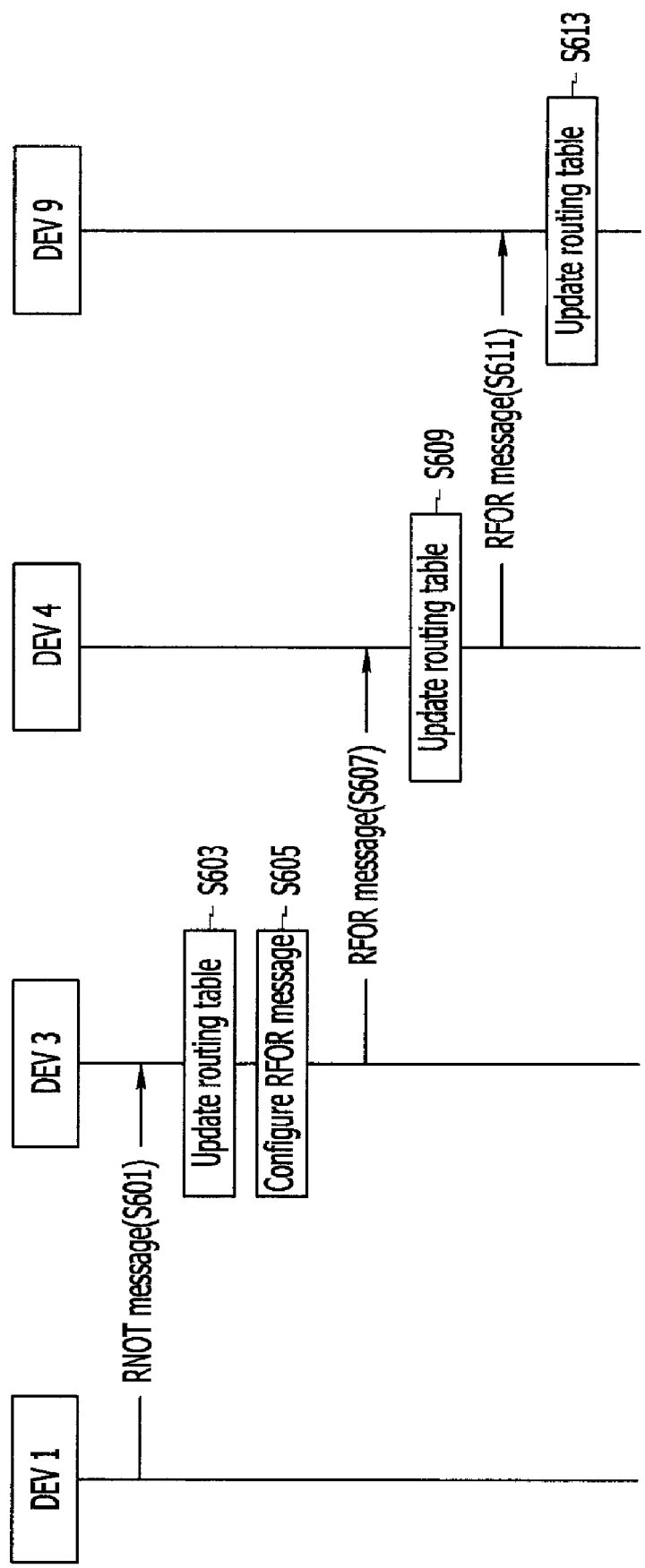
FIG. 10 is a diagram showing a bypass route setting method according to an exemplary embodiment of the present invention.

FIG. 10 is a diagram showing a bypass route setting method according to an exemplary embodiment of the present invention.

As shown in FIG. 10, the third device 150 first receives the route notification (RNOT) message including the bypass route information between the tenth device 410 and the fifth device 210 from the first device 110 (S601). At this time, the optimal route between the tenth device 410 and the fifth device 210 may follow Table 3, and the bypass route between the tenth device 410 and the fifth device 210 may follow Table 4.

TABLE 4

| Origination Device | Tenth Device |
| First Passage Device | Ninth Device |
| Second Passage Device | Fourth Device |
| Second Passage Device | Third Device |
| Destination Device | Fifth Device |

When the bypass route follows Table 4, the bypass route information may include an address of the piconet controller on the optimal route between the origination devices and the destination devices, that is, the address of the ninth device 350, the address of the fourth device 170, and the address of the third device 150, and the optimal route cost between the origination piconet controller and the destination piconet controller, that is, the optimal bypass cost between the ninth device 350 and the third device 150.

Then, the third device 150 updates the routing table stored in the third device 150 according to the bypass route information of the received route notification message (S603).

Thereafter, the third device 150 generates route formation (RFOR) message that allows the device on the bypass route corresponding to the bypass route information to form the route between the tenth device 410 and the fifth device 210 (S605). At this time, the piconet controller that receives the route formation message may update the routing table according to the bypass route information included in the route formation message.

Then, the third device 150 transmits the received route formation message to the fourth device 170 in reverse order of the bypass route between the tenth device 410 and the fifth device 210 (S607).

Thereafter, the fourth device 170 updates the routing table stored in the fourth device 170 according to the bypass route information of the received route formation message (S609).

Then, the fourth device 170 transmits the received route formation message to the ninth device 350 in reverse order of the bypase route between the tenth device 410 and the fifth device 210 (S611).

Thereafter, the ninth device 350 updates the routing table stored in the ninth device 350 according to the bypass route information of the received route formation message (S613).

Thereby, when having data to be transmitted to the fifth device 210, the tenth device 410 may transmit the data frame to the fifth device 210 through the bypass route, that is, the route passing through the ninth device 350, the fourth device 170, and the third device 150, based on the routing table stored in the ninth device 350 that is the piconet controller of the tenth device 410.

A flow of messages at the time of setting a bypass route between the ninth device 350 and the third device 150 according to an exemplary embodiment of the present invention will be described with reference to FIG. 11.

Figure 11:
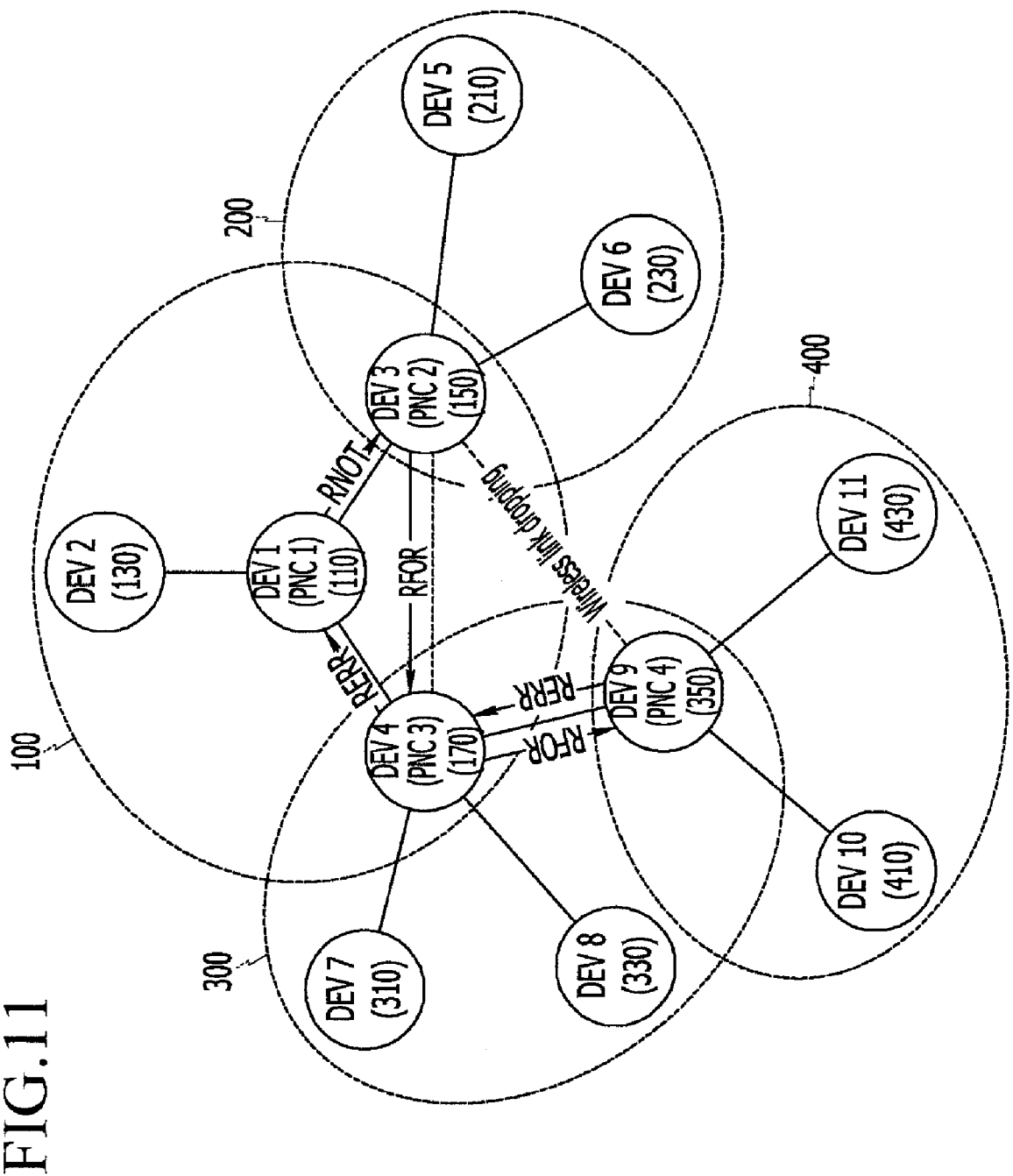
FIG. 11 is a diagram showing a flow of messages at the time of setting a bypass route according to an exemplary embodiment of the present invention.

FIG. 11 is a diagram showing a flow of messages at the time of setting a bypass route according to an exemplary embodiment of the present invention.

As shown in FIG. 11, when recognizing the wireless link drops between the ninth device 350 and the third device 150, the ninth device 350 transmits the REFF message to the fourth device 170 that is the piconet controller of the ninth device 350.

The fourth device 170 transmits the RERR message received from the ninth device 350 to the first device 110 that is the piconet controller of the fourth device 170.

The first device 110 transmits the RNOT message including the bypass route information between the ninth device 350 and the third device 150 to the third device 150 according to the RERR message received from the fourth device 170.

The third device 150 transmits the RFOR message to the fourth device 170 in order to form the bypass route between the ninth device 350 and the third device 150 according to the bypass route information of the RNOT message received from the first device 110.

The fourth device 170 transfers the received RFOR message to the ninth device 350.

The ninth device 350 sets the bypass route between the ninth device 350 and the third device 150 according to the received RFOR message.

According to the embodiments of the present invention, it is possible to perform the optical route-based routing using the topology server in the high rate WPAN, thereby making it possible to perform the multi-hop communication between the piconets.

The above-mentioned exemplary embodiments of the present invention are not embodied only by a method and apparatus. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A routing table generating method in a wireless personal network including a plurality of devices, wherein the wireless personal network includes a plurality of piconets, and the plurality of piconets including a parent piconet and a plurality of child piconets, the routing table generating method comprising:
    transmitting, by a controller of the parent piconet, a link state request message to each controller of the plurality of child piconets;
    receiving, by the controller of the parent piconet, a plurality of link state registration messages from each controller of the plurality of child piconets;
    generating, by the controller of the parent piconet, a link cost table including the link state information between each controller of the plurality of child piconets and the controller of the parent piconet based on the plurality of link state registration messages; and
    generating, by the controller of the parent piconet, the routing table including optimal route information between a first device and a second device among the plurality of devices by applying a minimum cost algorithm to the link cost table.

2. The routing table generating method of claim 1, wherein: each link state registration message includes the link state information of the corresponding child piconet.

3. The routing table generating method of claim 1, wherein: the controller of the parent piconet limits the number of hops transmitted by the link state request message by using time-to-live (TTL) to control the amount of link state information.

4. The routing table generating method of claim 2, wherein: the transmitting the link state request message comprises designating a sort of quality of service (QoS) to be included in the link state information, and wherein the sort of QoS includes at least one of a link characteristic indicator (LQI), remaining channel time allocation (CTA), or delay time.

5. The routing table generating method of claim 1, wherein: the optimal route information includes addresses of devices existing on the optimal route between the first device and the second device, and
    the devices existing on the optimal route include the controller of the piconet including the first device among the plurality of piconets and the controller of the piconet including the second device among the plurality of piconets.

6. The routing table generating method of claim 5, wherein: the optimal route information includes addresses of devices existing on the optimal route between the first device and the second device, and
    the devices existing on the optimal route include the controller of any one of some piconets other than the piconet including the first device and the piconet including the second device in the plurality of piconets.

7. The routing table generating method of claim 1, further comprising:
    receiving, by the controller of the parent piconet, a route discovery message for discovering a route between the first device and the second device from the controller of the piconet including the first device; and
    transmitting, by the controller of the parent piconet, a route notification message including the optimal route information to the controller of the piconet including the second device according to the route discovery message.

8. The routing table generating method of claim 1, further comprising:
    receiving, by the controller of the parent piconet, a route error message notifying that a wireless link drops between a controller of a second piconet and a controller of a first piconet among the plurality of piconets from the controller of the first piconet including a first device, and
    updating, by the controller of the parent piconet, the routing table based on the route error message.

9. The routing table generating method of claim 8, wherein: the updating the routing table updates the optimal route information to bypass route information between the first device and the second device.

10. A data transmission method in a wireless personal network including a plurality of devices, wherein the wireless personal network includes a plurality of piconets and a topology server, the topology server including routing route information between the plurality of devices, the data transmission method comprising:
    receiving, by a first controller of a first piconet among the plurality of piconets, a data frame to be transmitted from a first device included in the first piconet to a second device included in a second piconet among the plurality of piconets;
    transmitting, by the first controller, a route discovery message for discovering a route between the first device and the second device to the topology server when there is no route information between the first device and the second device in the first controller;
    receiving, by the first controller, a route formation message including route information between the first device and the second device from a second controller included in the second piconet, wherein the route formation message from the second controller is generated based on information from the topology server according to the route discovery message; and
    transmitting, by the first controller, the data frame to the second device via the second controller according to the route information.

11. The data transmission method of claim 10, wherein: the route information includes addresses of devices existing on an optimal route between the first device and the second device.

12. The data transmission method of claim 10, wherein: the route information includes an address of the first controller and an address of the second controller.

13. The data transmission method of claim 12, wherein:
the route information further includes an address of a third controller included in a third piconet of the plurality of piconets.

14. The data transmission method of claim 10, further comprising:
transmitting the data frame to the second device according to the route information when the first controller stores the route information.

15. The data transmission method of claim 10, further comprising:
storing, by the first controller, an optimal route between the first device and the second device according to the route information.

16. A routing route formation method in a wireless personal network, wherein the wireless personal network includes a plurality of piconets and a topology server, the topology server including routing route information between the plurality of devices, the routing route formation method comprising:
receiving, by a first controller included in a first piconet of the plurality of piconets, a route notification message including route information between a first device included in the first piconet and a second device included in a second piconet among the plurality of piconets from the topology server;
updating, by the first controller, an optimal route between the first device and the second device stored in the first controller according to the route information;
generating, by the first controller, a route formation message including the route information to form the route between the first device and the second device; and
transmitting, by the first controller, the route formation message to the second controller included in the second piconet so that the second controller updates the optimal route between the first device and the second device according to the route information.

17. The routing route formation method of claim 16, wherein:
the route information includes addresses of devices existing on the optimal route between the first device and the second device.

18. The routing route formation method of claim 17, wherein:
the route information includes an address of the first controller and an address of the second controller.

19. The routing route formation method of claim 18, wherein:
the route information further includes an address of a third controller included in a third piconet of the plurality of piconets.

20. The routing route formation method of claim 16, wherein the route notification message is generated by the topology server and is based on a route error message notifying that a wireless link drops between the first device and the second device.

* * * * *